United States Patent

Sharony et al.

[11] Patent Number: 5,953,143
[45] Date of Patent: Sep. 14, 1999

[54] MULTIDIMENSIONAL SWITCHING NETWORKS

[75] Inventors: Jacob Sharony, Nanuet, N.Y.; Yao Li, Monmouth Junction, N.J.

[73] Assignee: NEC Research Institute, Inc., Princeton, N.J.

[21] Appl. No.: 08/574,462

[22] Filed: Dec. 6, 1995

Related U.S. Application Data

[62] Division of application No. 08/055,730, Apr. 30, 1993, Pat. No. 5,495,356.

[51] Int. Cl.$^6$ ....................................................... H04J 14/02
[52] U.S. Cl. .......................... 359/128; 359/123; 359/139; 359/117
[58] Field of Search ................................... 359/128, 117, 359/125, 126, 137, 139, 123

[56] References Cited

U.S. PATENT DOCUMENTS

| | | |
|---|---|---|
| 4,830,444 | 5/1989 | Cloonan et al. . |
| 5,005,166 | 4/1991 | Suzuki et al. . |
| 5,023,863 | 6/1991 | Masuda . |
| 5,194,977 | 3/1993 | Nishio ...................................... 359/128 |
| 5,208,691 | 5/1993 | Nishio . |
| 5,227,906 | 7/1993 | Tokumitsu . |
| 5,303,077 | 4/1994 | Böttle et al. . |
| 5,315,423 | 5/1994 | Hong ........................................ 359/124 |
| 5,369,514 | 11/1994 | Eilenberger et al. .................... 359/117 |
| 5,623,356 | 4/1997 | Kaminow et al. ....................... 359/117 |
| 5,677,778 | 10/1997 | Kanterakis et al. ..................... 359/117 |

FOREIGN PATENT DOCUMENTS

| | | |
|---|---|---|
| 48-15253 | 2/1973 | Japan . |
| 50-104505 | 8/1975 | Japan . |
| 51-135308 | 11/1976 | Japan . |
| 53-119659 | 10/1978 | Japan . |
| 61-77490 | 4/1986 | Japan . |
| 62-279800 | 12/1987 | Japan . |
| 63-50194 | 3/1988 | Japan . |
| 64-90696 | 4/1989 | Japan . |
| 2-27892 | 1/1990 | Japan . |
| 2-4096 | 1/1990 | Japan . |
| 2-48898 | 2/1990 | Japan . |
| 2-54219 | 2/1990 | Japan . |
| 2-235029 | 9/1990 | Japan . |
| 3-7916 | 1/1991 | Japan . |
| 3-101716 | 4/1991 | Japan . |
| 3-99599 | 4/1991 | Japan . |
| 5-30556 | 2/1993 | Japan . |

OTHER PUBLICATIONS

Smith, D. W. et al., "Multidimensional Optical Switching Networks," *IEEE, British Telecom Research Labs.*, pp. 10–13 (1989).

"Wavelength Selective Optical Crossconnect," *IBM Technical Disclosure Bulletin*, vol. 34, No. 10A, pp. 29–31 (Mar. 1992).

*Primary Examiner*—Rafael Bacares
*Attorney, Agent, or Firm*—Arthur J. Torsiglieri; Jeffery J. Brosemer; Andrew G. Isztwan

[57] ABSTRACT

A switching network that utilizes at least three degrees of freedom, time, wavelength and space. In one embodiment that involves point-to-point switching, each space channel between an input and an output is assigned a time slot and wavelength coordinate characteristic of the output and the input transmitter and output receiver are tuned to the appropriate time and wavelength coordinates and selective switching is used to complete the space channel between the input and output. In another embodiment for generalized switching, each input channel is assigned a set of space, time slot and wavelength coordinates and an input signal is broadcast to all of the outputs which selectively makes connection to those inputs with an appropriate set of coordinates.

6 Claims, 5 Drawing Sheets

1

MULTIDIMENSIONAL SWITCHING NETWORKS

This is a division of application Ser. No. 08/055/730 filed Apr. 30, 1993, not U.S. Pat. No. 5,495,356.

FIELD OF THE INVENTION

The present invention relates to switching networks and more particularly to switching networks that employ at least three dimensions, generally where a dimension is defined as a degree of freedom, such as, time, space, wavelength and direction.

BACKGROUND OF THE INVENTION

Future communication networks will need to have both high capacity and high connectivity, to meet the demands set by different applications (e.g., multi-media, parallel processing). High capacity is needed to convey large amounts of information to a number of users, and high connectivity is needed to support a large number of users.

There are two main advantages when using several dimensions, the first being reduced complexity and the second being increased connectivity (i.e., scalability). The reasoning behind these advantages is that it is hard to achieve a large number of distinct channels in one dimension due to limits set by physical factors (e.g., crosswalk, finite spectrum, logic speed). However, when several dimensions share the load these limits are relaxed to allow a much larger number of distinct channels; e.g., in a one-dimensional network 10,000 distinct channels crowded in that dimension may be required, whereas, when two dimensions are used only 100 distinct channels are needed in each dimension to achieve the same connectivity of 10,000. For example, 2-dimensional networks using both the wavelength and space dimensions can achieve a desired connectivity with few spatial elements and higher connectivity than one-dimensional networks (either the wavelength or space-dimension). Higher dimension networks can result in still fewer spatial elements and still higher connectivity. For example, in a three dimensional network, using time, space and wavelength, a connectivity of 1,000 can be achieved with a size of 10 for each dimension and a connectivity of 1,000,000 with a size of 100 for each dimension.

Moreover, by appropriate design, it is known to be feasible to increase connectivity in a network without a commensurate increase in hardware complexity, where hardware complexity of a network is defined as the number of basic active switching elements needed.

SUMMARY OF THE INVENTION

The invention relates to multidimensional networks including at least time space and wavelengths as separate dimensions. There are two basic approaches to the practice of the invention.

In the first approach, which is best adapted for point-to-point communication, a connection in the multi-dimensional network is created between a given sending station, or input, and a given receiving station, or output, in three steps under the direction of a central control. These steps involve first assigning a coordinate to each of the dimensions other than space, then tuning the input transmitter and the output receiver to these coordinates, and finally setting any switches in the spatial network to create a path satisfying the coordinate between the input and output by selective switching. Conventional techniques can be used to control the switching.

In the second approach, designed particularly for non-blocking generalized switching networks in which an input can be connected to one or more outputs even one already connected, each input is provided with a unique set of spatial dimension, wavelength dimension, time-slot dimension and sometimes even a direction dimension and an output selects an input by seeking out one with an appropriate set of dimensions. This may be viewed as a system in which N inputs are connected to a passive broadcast medium that broadcasts all the inputs to each one of N outputs. Each input is on a unique κ-dimensional channel, defined by κ coordinates and composed of κ fixed channels, one per dimension. On the other end of the network, each one of the N outputs can select any input by selecting its appropriate coordinate in each dimension. An intermediate switching network controlled in any appropriate fashion completes the appropriate path between input and output.

The invention will be better understood from the following more detailed description taken with the accompanying drawings.

DETAILED DESCRIPTION OF THE INVENTION

Figure 1:
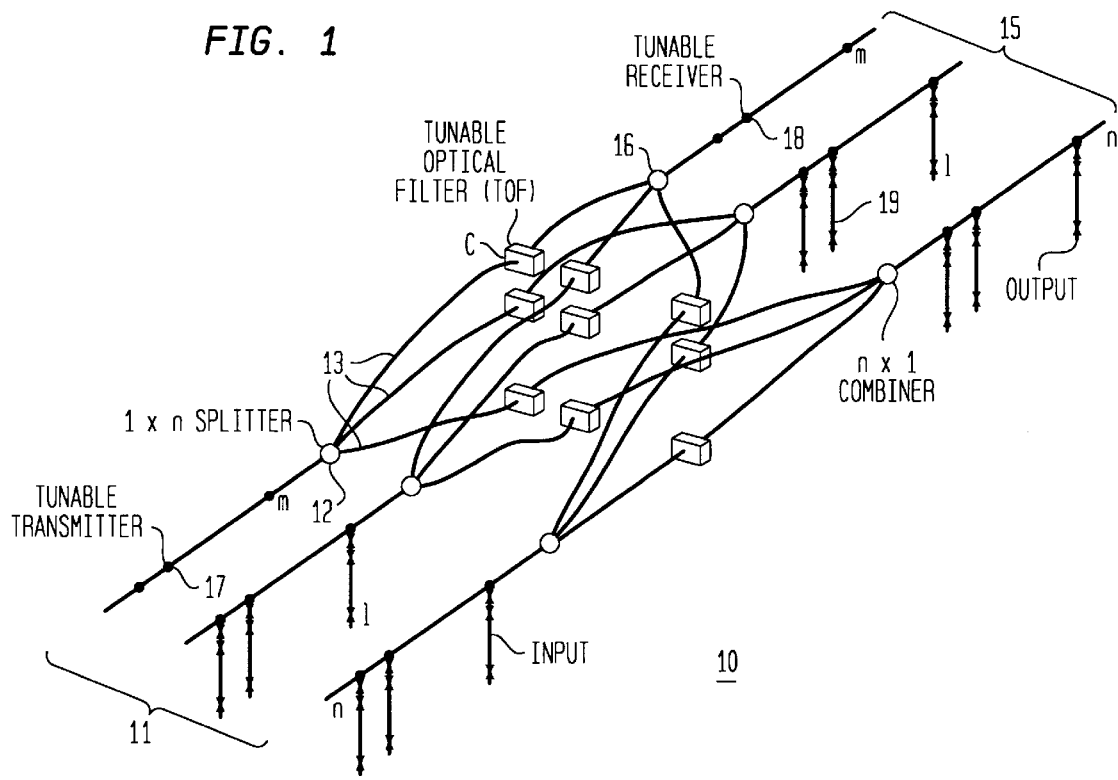
FIGS. 1 and 2 show schematically embodiments of point-to-point switching networks using five stages and three stages, respectively, in accordance with a first approach the invention.

With reference now to the drawing, FIG. 1 shows a wavelength-time-space point-to-point switching network 10 that is symmetrical with live stages of switching (time, wavelength, space, wavelength and time). Both wavelength and time division multiplexing are used with a multiplexing factor of the product of 1 and m, where 1 is the number of time division subchannels and m is the number of wavelength subchannels. The spatial network is a wavelength selective cross-type and is based on the vector-matrix multiplication architecture using tunable optical filters (TOFs) for selectivity, for example, of the kind described in an IBM Technical Disclosure Bulletin Vol. 34 #10A, March 1992. The network permits point-to-point interconnection.

To avoid excessive complexity in the numbering of the elements of the network, the same reference numeral will be given to all like elements that bear the same relationships and perform the same function in the network.

The spatial network (crossbar) comprises n input fibers, 11, each one of which is connected to an 1xn optical splitter 12, (shown as a hollow circle) which splits the optical energy between n fibers 13 connected to column of TOFs 14 (tunable optical filters), such that inpu j broadcasts to all n TOFs in column j. On the other side of the matrix, each one of the output fibers 15 collects the optical energy from n fibers connected to the corresponding row by way of combining means 16 such that output i collects from row i. In this configuration there are $n^2$ independent TOFs, each one of them responsible for the connection between each input-output fiber pair. The TOF in this context refers to an optical filter that has one input fiber and one output fiber, and that can select for transmission simultaneously up to a determined number of wavelengths. To select specific wavelengths out of the TOF, an electrical control signal is applied from a control network shown schematically by lead C. When the TOF is realized in acousto-optics technology, this signal is an RF signal which generates and acousto signal that selects the desired wavelengths. To send wavelength $\lambda_k$ at time-slot $t_p$ from input fiber j to output fiber i, a control RF signal must be applied at time slot $t_p$ with frequency $f_k$ to the TOF $a_{ij}$, where $f_k$ is proportional to 1 $\lambda_k$. Each of the TOFs is controlled independently in any appropriate fashion known in the art. In case of multiple wavelengths being passed simultaneously, the RF control signal has to contain the corresponding frequencies.

On each fiber 11 there are m wavelength transmitter nodes, each node characterized by a tunable transmitter 17 (shown by the circles) that is coupled to the fiber. To each tunable transmitter l time nodes are provided. (denoted schematically by the Xs on the vertical lines to the tunable transmitters 17. The total number of time nodes (each represents one input) is N=lmn. Time nodes which are connected to a specific tunable transmitter all have different sub-channels (slots); similarly, tunable transmitters sharing a common fiber have different wavelength sub-channels. The output stages have an analogous construction; each one of the n output fibers 15 associated with the n TOFs supplies to m tunable receivers 18 (shown by full circles). To each tunable receiver l time nodes 19 (shown by Xs on the vertical lines,) are provided. The total number of time nodes (outputs) is N=lmn. Tunable receivers that are placed on a common fiber all have different wavelength sub-channels. Similarly, time nodes connected to a common tunable receiver all have different time sub-channels.

A connection between an input and an output is established via a path composed of 3 sub-channels, one in each dimension, i.e., via the triplet ($\lambda_h$, $t_i$, $s_j$). The total number of simultaneous connections in the network is therefore: N=lmn. Supporting all possible configurations (N!) requires full tunability of optical transmitters and receivers to a selected coordinate of the wavelength dimension, and time-slot interchangers (TSIs) that would be used for the time multiplexing to a selected coordinate of the time dimension, and a reconfigurable wavelength-time selective switch that would provide the desired routing in response to the control signals corresponding to the time and wavelength coordinates. The number of sub-channels in the wavelength and time dimensions depends on the mode of operation, i.e., rearrangeable (one in which existing connections may need to be rearranged to permit a connection between an idle input and output pair) or non-blocking, (one in which a connection can be made between any ideal input and output pair without disturbing existing connections). It can be shown that for a system to be rearrangeable, m wavelength sub-channels and l time sub-channels are required; whereas, for a system to be non-blocking 2m−1 wavelength sub-channels and 2l−1 time sub-channels are sufficient.

To explain the routing process, we use graph theoretical notations for which, some useful definitions follow. A graph G is a collection of vertices and edges; an edge (v,w) is an unordered set of two distinct vertices. If an edge (v,w) can occur more than once, G is a multigraph. Edge (v,w) is incident to p and w, and vertices p and w are adjacent. A graph is bipartite, with vertex sets $S_1$, $S_2$, if $S_1$ and $S_2$ partition the vertices so that each edge is incident to a vertex in $S_1$ and a vertex in $S_2$. The degree of a vertex v is the number of edges incident to p. A graph is regular if all vertices have the same degree.

A matching M of G is a set of edges, no two of which are incident to the same vertex; M covers any vertex incident to an edge in M. An edge coloring of G is an assignment of a color to each edge in G. Thus, all edges of a given color form a matching. A minimal edge coloring uses the fewest number of colors possible. An on-line edge coloring is an assignment of color to each edge in G, where adjacent edges (i.e., that incident to a common vertex) have different colors, edges are connected/disconnected in progress, and rearrangement of color assignment is now allowed.

The routing process is as follows, first the rearrangeable case is considered. Given a list of required connections, the time sub-channels assignment is found by "edge-coloring" of a bipartite multigraph (BPMG) of degree l and with a set of 2mn vertices. For each time sub-channel (total of l) we proceed to find the wave-length sub-channels assignment. This is done by "edge-coloring" of l BPMGs each of degree m and a set 2n vertices (which can be done in parallel). After this there is found the wavelength and time sub-channels for each input-output pair; the pace sub-channel is found easily by recognizing the TOF connecting the appropriate input and output fibers of the input-output pair. Note that the above channel assignment is done in series (first the time, followed by the wave-length and then the space). The time needed to find the input-output channel is $O(N\log_2 N)$. To clarify, consider a particular given with n=3, m=2 and l=2, i.e., N=12. Each of the 12 inputs/outputs is described by a triplet (u,v,w) corresponding to the actual physical location of the input/output, where u corresponds to which fiber this input/output is connected, v corresponds to which tunable transmitter/receiver the input/output is attached and w is the physical location of the input/output on the vertical line attached to each transmitter/receiver, e.g., (2,1,2) corresponds to an input/output connected to fiber number 2 via transmitter/receiver number 1, and this input output is located at the bottom of the vertical line attached to transmitter/receiver number 1. In the rearrangeable case we are given a list of 12 connections, each of which is described by two triplets of the corresponding input and output.

First, the time slot for each connection is determined by edge-coloring of one BPMG with degree l=2 and 2mn=12 vertices. Each of the 12 pairs is assigned one of 2 possible time slots (e.g., $t_0$ or $t_1$). To find the wavelength sub-channel for each of the connections we proceed to 2 BPMG (one for each time slot) each of degree m=2 with a set of 2n=6 vertices. The edges in these graphs are determined once the time slots assignment is complete. After edge-coloring of the 2 graphs the wavelength assignment is complete, where each connection was given one of 2 wavelength sub-channels (e.g., $\lambda_0$ or $\lambda_1$).

The routing process in the non-blocking case is somewhat different, and is done independently for each input-output pair. To connect a specific pair we use only 2 BPMGs: first we use an l degree BPMG with a set of 2mn vertices and find the corresponding time sub-channel using "on-line edge-coloring". Once the time sub-channel was found we refer to the corresponding BPMG (of the time sub-channel found before) of degree m and with a set of 2n vertices. Using "on-line edge-coloring" we find the corresponding wavelength sub-channel. The space sub-channel is found by identifying the corresponding input and output fibers of the input-output pair. The time needed to find the input-output channel is $O(l=m)$ or $O(N^{1/3})$ when $l,m,n=N^{1/3}$.

Figure 2:
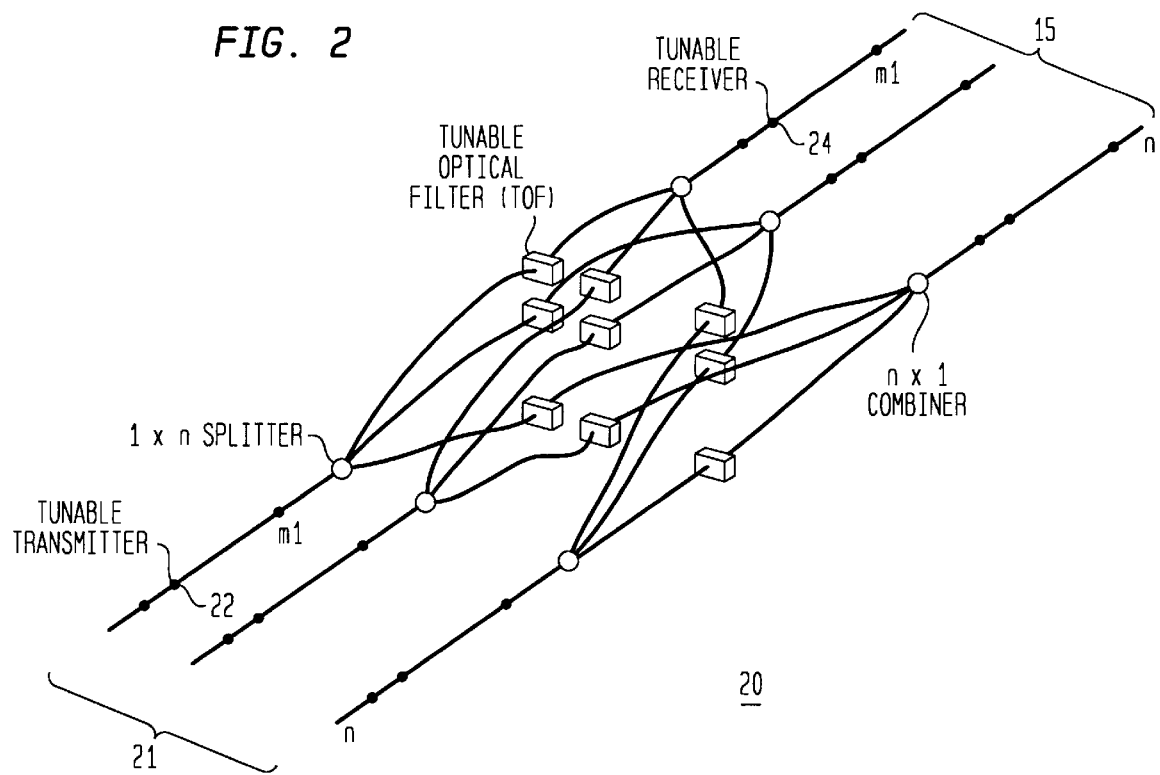

In the FIG. 1 embodiment, we had only one dimension in each switching stage; however, it is possible to have more than one dimension in a switching stage (i.e., consolidating 2 or more dimensions into one stage). The network 10 of FIG. 1, can be configured without change in function with 3 stages rather than 5 stages, i.e., (TW)S(WT) where the time and wavelength dimensions are combined together. A realization of a 3-dimensional 3-stage point-to-point wavelength-time-space network 20 is shown in FIG. 2. In this case, the spatial network comprising the splitters 12, TOFs 13 and combiners 16 is the same as in the 5 stage case, and so will not be discussed. However, the input/output stage differs as follows. On each input fiber 21 there are lm tunable transmitters 22. Each tunable transmitter 22 sharing a common fiber has a different wavelength—time-slot pair. The number of different wavelength—time-slot pairs required for a strictly non-blocking network is 2lm−1. For a rearrangeable network it can be shown that lm wavelength—time-slot pairs are required. Each one of the n output fibers 23 is connected to lm tunable receivers 24. Tunable receivers that are placed on a common output fiber are all have different wavelength—time-slot pairs. The total number of simultaneous connections in the network is therefore: N=lmn. To support all possible configurations, full tunability of transmitters and receivers, and a reconfigurable crossconnect for routing are needed.

The routing algorithm of this network has a time complexity of 2lm and $O(NLog_2^n)$ for the non-blocking and rearrangeable cases,, respectively. Note that this time complexity is higher (for non-blocking) than in the previous 5-stage network—(2)l+m)), however, the number of channels in each dimension is reduced. In the 5-stage case we need 2m−1 wavelength sub-channels and 2l−1 time sub-channels (slots), whereas, in the 3-stage case only 2lm−1 wavelength—time-slot pairs are required. For the rearrangeable case there is no significant difference between the 3-stage and the 5-stage cases in this respect.

There are a variety of other embodiments that can be used for multidimensional point-to-point networks.

There will now be described an embodiment 30 utilizing fiberoptics and photonic devices that is based on the second approach.

Figure 3:
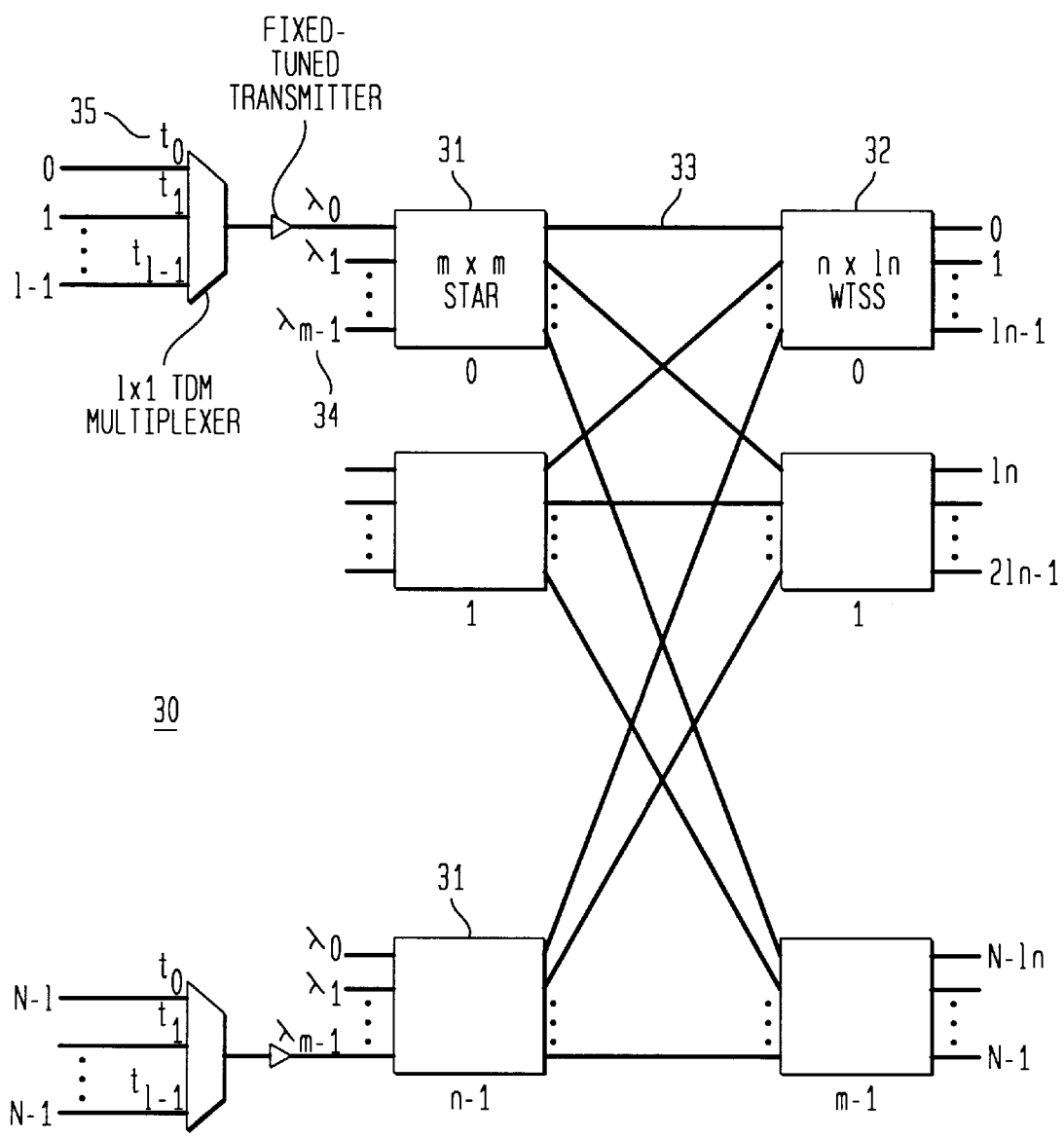
FIG. 3 shows schematically a generalized switching network with a star-switch architecture for use in switching networks in accordance with a second approach of the invention.
Figure 4:
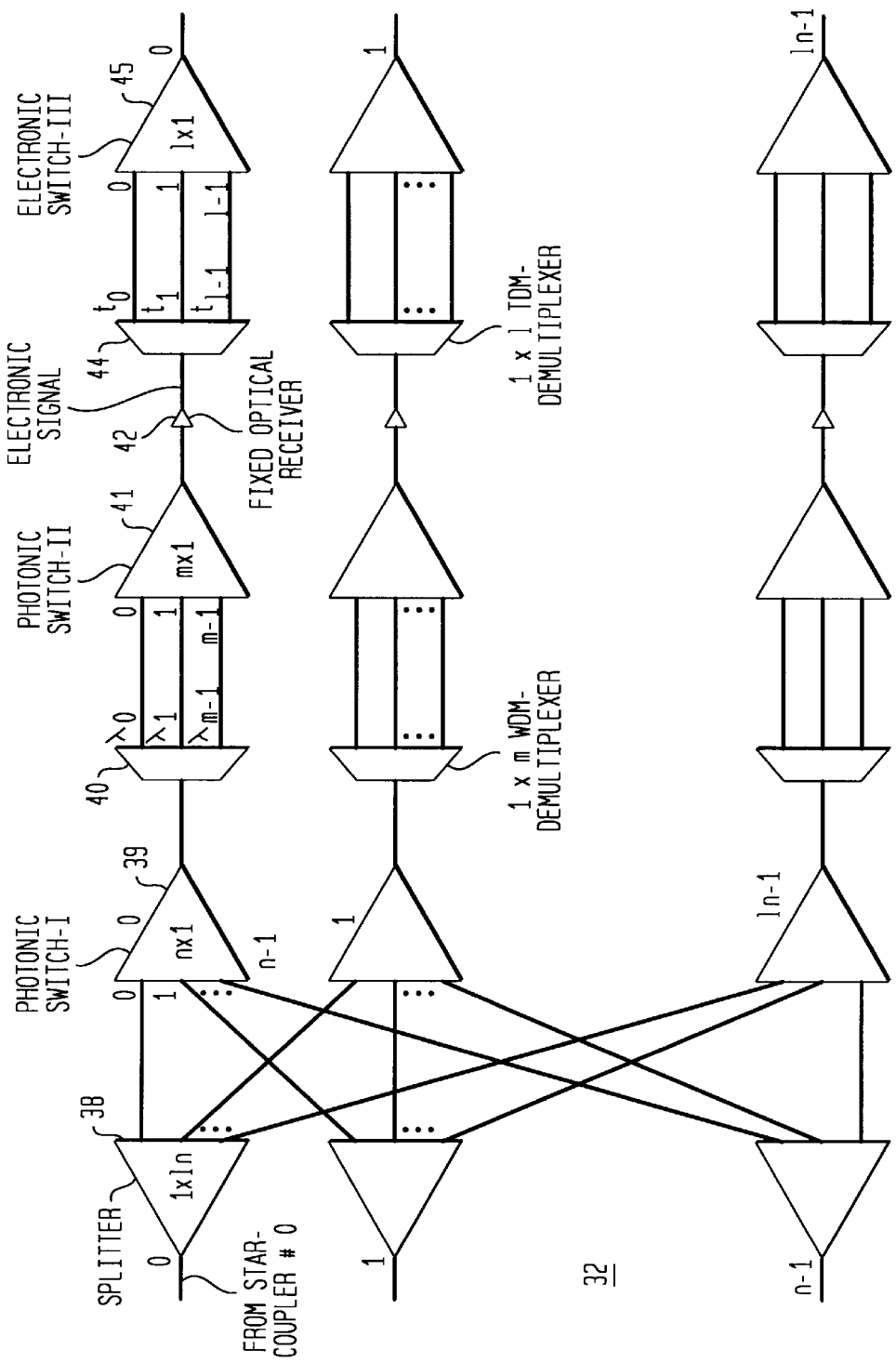
FIG. 4 shows in more detail a switch for use in the switching network of FIG. 3.

This switching network 30 similarly involves n space sub-channels, m wave-length sub-channels and l time sub-channels with a total number of connections N=lmn and will be termed the Star-Switch (STSW) architecture. The STSW has two stages, the first stage shown in FIG. 3 is composed basically of n mxm star couplers 31 and the second stage shown is composed of m nxln Wavelength-Time Selective Selective Switches 32 (WTSSs). The two stages are connected to each other by mn optical links 33, that may be optical fibers. To each one of the n star couplers 31, m optical transmitters 34 are connected, each fixed with a different wavelength (e.g., $\lambda_0, \lambda_1, \ldots \lambda_{m-1}$). Each optical transmitter 34 is driven by an electrical signal composed of l inputs multiplexed in time (e.g., $t_0, t_1, \ldots t_{l-1}$) by a time division multiplexer 35. Thus, each input channel space is uniquely identified by a triplet indicating the fixed sub-channels it uses in each of the three dimension, i.e., ($s_i, \lambda_j, t_p$). Each WTSS 32 has ln outputs and it receives the entire information from all the N inputs. FIG. 4 shows in detail one possible form of WTSS 32. As shown, it is composed of 1xln splitters 38, nx1 photonic switches 39, 1xm WDM-demultiplers 40 (WDMD), mx1 photonic switches 41 fixed wavelength optical receivers 42, 1xl TDM-demultiplexers 44 (TDMD) and single-out lx1electronic switches 45. The first part of an WTSS is composed of splitters 38 and photonic switches 41 in the nxln tree configuration. Each one of the tree's inputs is connected to a different star-coupler. The second part of the WTSS is composed of WDMDs 40 and photonic switches 41 to provide filtering of a specific wavelength out of a pool of m different wavelengths. The filtered wavelength is followed by an optical receiver 42 which converts the optical signal to an electronic signal. The electronic signal is fed to a 3rd stage of TDMDs 44 and electronic switches 45, where one of l time-multiplexed signals is selected by a specific output.

The splitters, photonic/electronic switches, WDMDs (e.g., interference filters) and TDMDs advantageously are composed of their basic elements arranged in a 1×2 binary tree structure in known fashion. To connect input i to output j in the STSW (t,j=0, 1, . . . N−1), only three switches have to be set in a unique way: in photonic switch 39 of output j, input [i/lm] has to be switched; in photonic switch 41 of output j, input i modlm has to be switched, and in electronic switch 45 of output j, input i modl has to be switched. By setting these three switches appropriately, any input can be selected. The total number of active switching stages (of 1×2switching elements) is $\log_2 N$. The switching elements are set easily since they are arranged in a binary tree structure. The switching time of the STSW is of the order of nanoseconds since the only active elements in the network are the photonic/electronic switches which can be very fast. If the network is to be self-routing, the control signals for the switches can be included in the address portion of the signal transmitted in known fashion. Alternatively, the control signals can be provided by a separate control network in known fashion.

The multi-dimensional network concept can also be physically implemented using the free-space optical processing techniques. In addition to maintaining the huge time bandwidth the fiberoptics can offer, free-space optics permits a possible additional degree of freedom, e.g., the angular or the spatial frequency dimension, so that information can be multiplexed in four dimensions, time, temporal frequency, space, and spatial frequency or angle direction of free space radiation. To understand how the angularly multiplexed signals can be handled in a multidimenstional non-blocking generalized switching network, consider the generalized diagrams shown in FIGS. 5A and 5B.

These diagrams are intended to illustrate how the angularity of free space light beams can be used to add spatial frequency as an additional degree of freedom. It can be appreciated that this arrangement can be modified by the inclusion of time-division and wavelength-division multiplexing on each of the inputs with appropriate multiplexing apparatus on each of the inputs and appropriate demultiplexing apparatus at the output and vice versa. This arrangement is intended for applications in which the inputs and outputs are relatively close, such as where they are parts of a single computer system.

In particular, since this is a generalized switching arrangement it permits each input to access any one or more of the outputs.

Figure 5A:
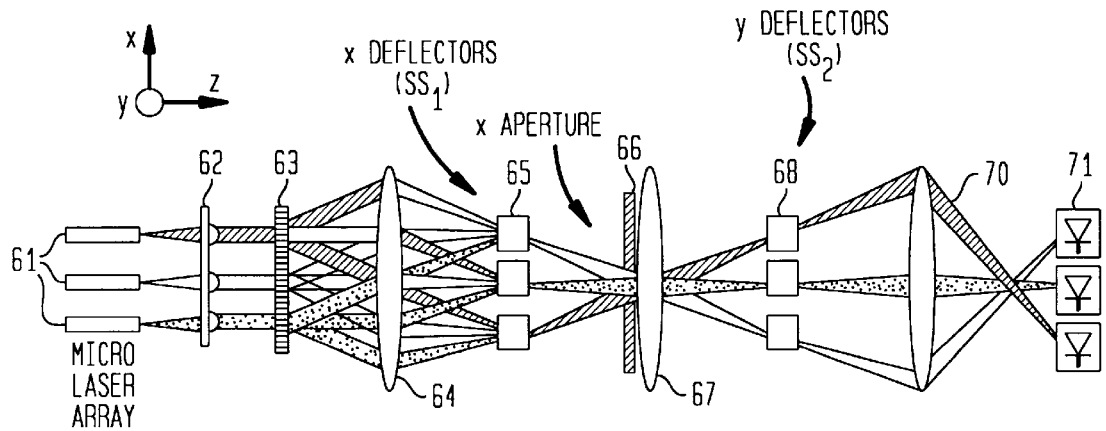
FIGS. 5A and 5B show two orthogonal views of a generalized switching network that uses direction as an additional dimension.
Figure 5B:
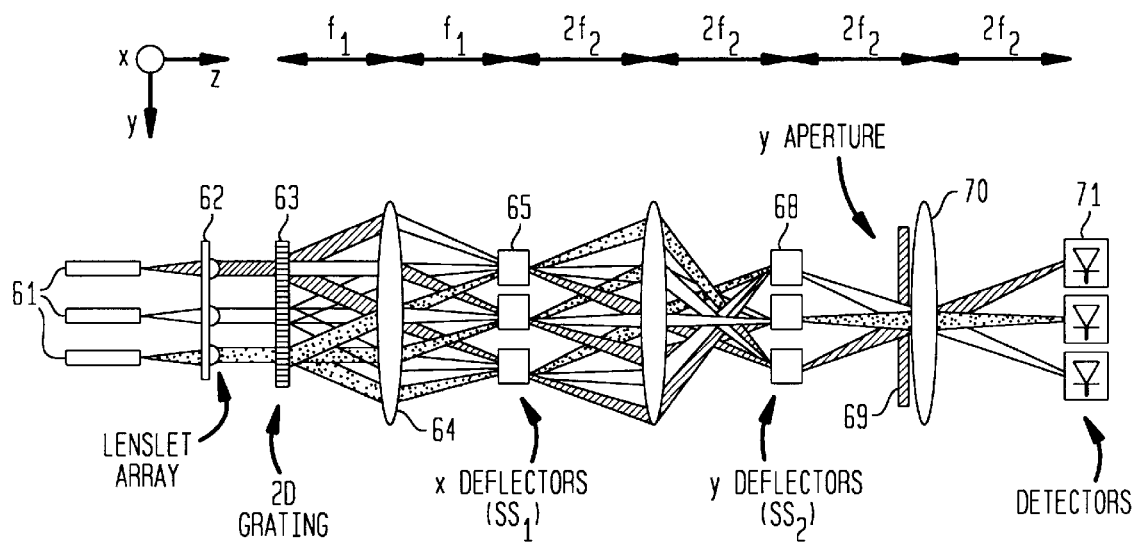

In particular, FIGS. 5A and 5B show top and side views of the 2D 3×3 free-space optical generalized switching network where the nine input signals provided by the nine laser sources 61 are collimated by a lenslet 62, one for each source, before being broadcast by a two dimensional grating 63 which converts each incident light spot into nine angularly multiplexed beams in a 3×3 array. The 81 resulting angularly multiplexed beams are focused by a single lens 64 into nine spatially defined spots at their crossovers before entering the SS1 array that contains nine acousto-optic deflectors 65 in a 3×3 array that deflect the signals only in the xz plane. Using a slit, 66 in front of a second lens 67, 29 (9×3) from the available S1 angularly multiplexed signals are selected. The SS2 also contains nine deflectors 68 in a 3×3 array but deflects on in the yz plane to make the final selection, by use of a list 69, of nine (3×3) signals from the 27 which are focused by lens 70 on the nine photodetectors 71. There are shown the sparings of the various optical elements in terms of focal lengths.

It should be apparent that each source can generate nine beams, one for each output. By selecting which of the nine beams of a given source will be allowed to reach any of the nine outputs, there is selected the one or more outputs to which connectivity is provided. This selection can be controlled by the voltages applied to the deflectors that can be used to select the beams that are to pass through the ax and y apertures. These voltages are determined by the spatial dimensions of the sources that are to be connected to a given output. For example, a memory can store codes corresponding to the relevant voltages needed for each of the possible connections and the appropriate voltage provided in response to an address included on the input signal provided by the source.

It should also be apparent that the principles can be extended to larger arrays by appropriate increase in the number of beams. For example, a 4×4 array would divide each original light beam into a 4×4 array or 16 light beams, each differently oriented by a two dimensional grating.

In general, two switching stages each containing mn deflectors with a total switching complexity of $O(m^2n+mn^2)$ can be used to perform the task of non-blocking generalized switching for mn signals as illustrated. When the wavelength and time dimensions are used in conjunction with it, even larger connectivity and capacity can be expected with further reduction in the complexity. Note that the switching speed in this implementation is of the order of microseconds limited by the acousto-optic effect used in the deflectors.

It is to be understood that the specific embodiments described are merely illustrative of the general principles of the invention. Various variations can be provided thereof without departing from the spirit and scope of the invention.

What is claimed is:

1. A transmission system capable of interconnecting each input of an nxn two dimensional array of light source inputs to any one or more outputs of an nxn two dimensional array of output comprising:

an nxm array of input sources of light beams;

an nxn array of output receivers of light beams;

means for forming the light beam of each input source into an nxn array of light beams, each having a different direction;

means for collecting the arrays of light beams from all the input sources and focusing them at their crossovers into an nxm array of spots, each spot representing the convergence of nxn beams;

means for deflecting the light beams associated with said spots in one of two orthogonal directions and selecting from each spot n beams to provide a total of $n^2 \times n$ light beams;

means for deflecting said $n \times n^2$ light beams in the other of the two orthogonal directions and selecting therefrom an array of nxn lights beams; and means for focusing the selected array of light beams on said nxm array of output receivers.

2. A generalized transmission system for interconnecting each input of and nxm two dimensional array of inputs to any one or more outputs of an nxm two dimensional array of outputs, the transmission system comprising:

an nxm array of input sources of light beams;

an nxm array of output receivers of light beams;

means for forming the beam of each input source into an nxm array of divided light beams, each having a different direction; and means for selecting on the basis of direction from each of said nxm arrays of divide light beams light beams destined for the output receivers to which the input source of said selected divided light beams was to be connected.

3. The generalized transmission system of claim 2 in which the light beam from an input source that is to be connected to an output source is passed through a two dimensional grating means for forming therefrom a two dimensional mxn array of light beams, each having a different direction and the array of light beams is passed through deflecting means, aperture means, and focusing means for selecting on the basis of direction the light beams for the output receivers associated with the outputs to be interconnected.

4. The transmission system of claim 2 in which said different directions are in free space.

5. The transmission system of claim 3 in which said different directions are in free space.

6. The transmission system of claim 2 in which the light beam from each input source is passed through a separate lenslet for collimation and then passed through a common two-dimensional grating for converting the beam into an array of nxn angularly multiplexed beams, and further comprising means for selecting from the nxn array of light beams associated with each input source a single light beam for incidence on a selected output receiver of the array of output receivers.

\* \* \* \* \*